E. J. CRAIG.
CULTIVATOR.
APPLICATION FILED SEPT. 15, 1908.
928,029.  Patented July 13, 1909.
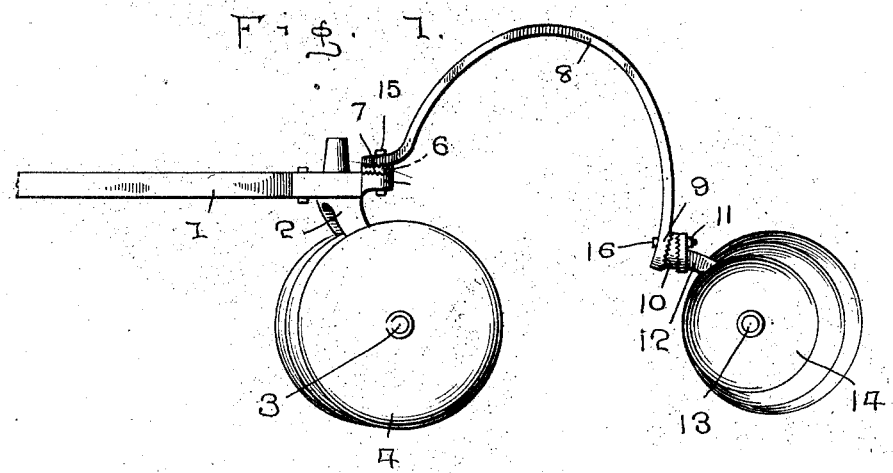
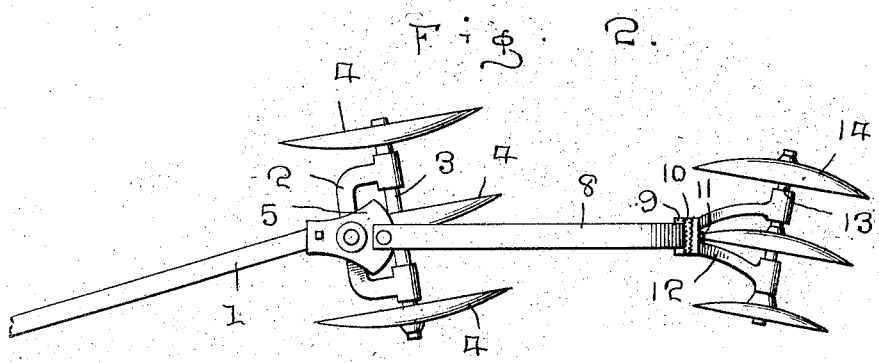
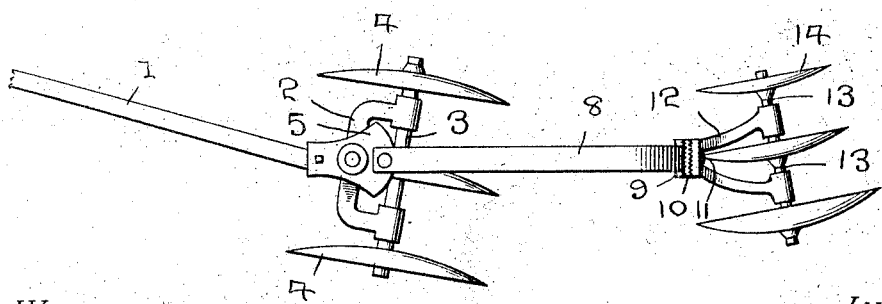
WITNESSES:
Thos. W. Riley
M. A. Newcomb
INVENTOR
E. J. Craig
BY
W. J. FitzGerald & Co.
Attorneys

UNITED STATES PATENT OFFICE.

EVERT JOSTON CRAIG, OF TUTTLE, OKLAHOMA.

CULTIVATOR.

No. 928,029.  Specification of Letters Patent.  Patented July 13, 1909.

Application filed September 15, 1908. Serial No. 453,122.

*To all whom it may concern:*

Be it known that I, EVERT JOSTON CRAIG, a citizen of the United States, residing at Tuttle, in the county of Grady and State of Oklahoma, have invented certain new and useful Improvements in Cultivators; and I do hereby declare the following to be a full, clear, and exact description of the invention, such as will enable others skilled in the art to which it appertains to make and use the same.

This invention relates to new and useful improvements in cultivators, and it is the object of the invention to provide a novel device to be employed in conjunction with a disk cultivator whereby the dirt may be thrown from the row, and to the row, thus producing an implement that does two plowings.

It is also the object of the invention to provide a novel device of this character wherein the attachment is secured to the cultivator proper through the medium of a bow-spring.

Furthermore, the invention has for an object to provide a novel device of this character wherein the connections of the spring with the cultivator and the connections of the auxiliary disks with the spring are employed in varying the cut of the auxiliary disks.

The invention also has for an object to provide a novel device of this character which is simple of construction, efficient and advantageous in practice, and comparatively inexpensive to manufacture.

With the above and other objects in view, the invention consists in the details of construction and in the novel arrangement and combination of parts to be hereinafter more particularly referred to.

In describing the invention in detail, reference will be had to the accompanying drawings forming part of this specification wherein like characters of reference denote corresponding parts in the several views, and in which—

Figure 1 is a view in side elevation of a fragment of a disk cultivator showing the invention applied. Fig. 2 is a top plan view of Fig. 1.

In the drawings, 1 denotes the beam of a cultivator having secured adjacent its rearward end the yoke 2, in which is mounted the shaft 3. Fixed to the shaft 3, are the disks 4, which are concave, and arranged as ordinarily.

Projecting rearwardly from the beam 1, is a casting 5, which has its upper surface 6 toothed and meshing with these teeth is the toothed surface of a wedge-shaped washer 7. The opposed face of the washer 7 is also toothed, and these teeth mesh with the toothed end surface of the under portion of the bow-spring 8. This bow-spring 8 is of sufficient size and strength and has the outer surface of its opposite end portion toothed, as at 9. This toothed portion is engaged by the toothed surface of a second wedge-shaped washer 10. The opposed face of this washer 10 is also toothed, and meshes with the toothed surface of a casting 11. This casting 11 is provided with the arms 12 in which is mounted the shaft 13, and fixed to the shaft 13 are the concave disks 14, said disks being opposed to the disks 4, before referred to.

In view of the foregoing, together with an inspection of the drawings, it is thought to be apparent that the two operations of plowing are performed by this machine, that is to say, the disks 4 will throw the dirt away from the row, and the disks 14 will throw the dirt toward the row.

The depth of the cut of the disks 14 can be adjusted by the washers 7 and 10. By changing the washers 10 the disks 14 are set straight, and by changing the washers 7, the disks 14 are caused to cut deeper. By "changing", it is meant reversing the position of the washer, that is to say, to so turn the washers as to bring the thin portions where the thick portions are now shown.

Other adjustments may be effected by changing the washers 7 and 10.

It is to be stated that the spring 8 is secured to the casting 5 through the medium of a bolt 15, which passes through said spring, and casting, and also through the washer 7. The opposite end of the spring is secured to the casting 11, through the medium of the bolt 16, which passes through the spring and casting, and through the washer 10.

In order to obviate confusion, it is stated that in the drawings a double cultivator is shown.

I claim:

1. A cultivator of the character described, comprising front and rear axles, means carried by, and receiving said axles, cutting disks fixed to said axles, a resilient beam of bow-like outline, and adjustable means of connection between said axle-carried means and said beam or reach.

2. A cultivator of the character described, comprising front and rear axles, carrying disk-like cutters, frames carried by, and receiving said axles, a resilient beam or reach of bow-like outline, means of connection between said reach or beam and said axle-carried frames, said means of connection including a serrated wedge having engagement with one end of said reach and the frame of the rear axle, and a serrated or notched member interposed between the opposite end of said reach and a serrated or notched part carried by the front axle frame.

In testimony whereof I have signed my name to this specification in the presence of two subscribing witnesses.

EVERT JOSTON CRAIG.

Witnesses:
ROBT. BABBS,
GEORGE HANES.